May 22, 1934.  P. V. REYNOLDS  1,959,989
FISHING ROD TIP AND THE LIKE
Filed March 21, 1933
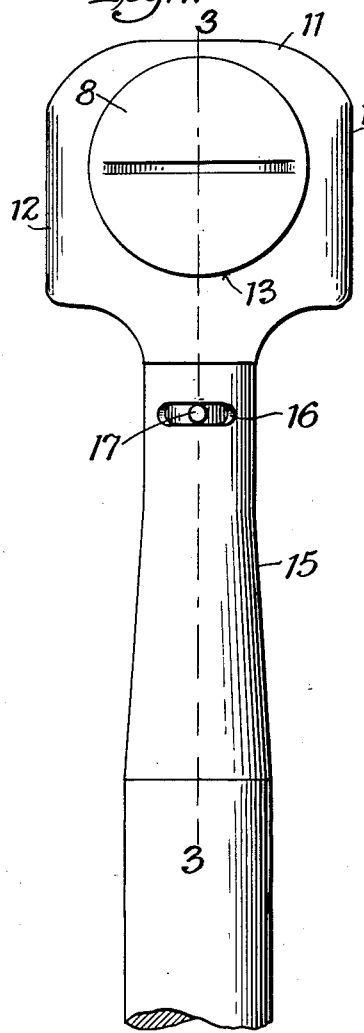
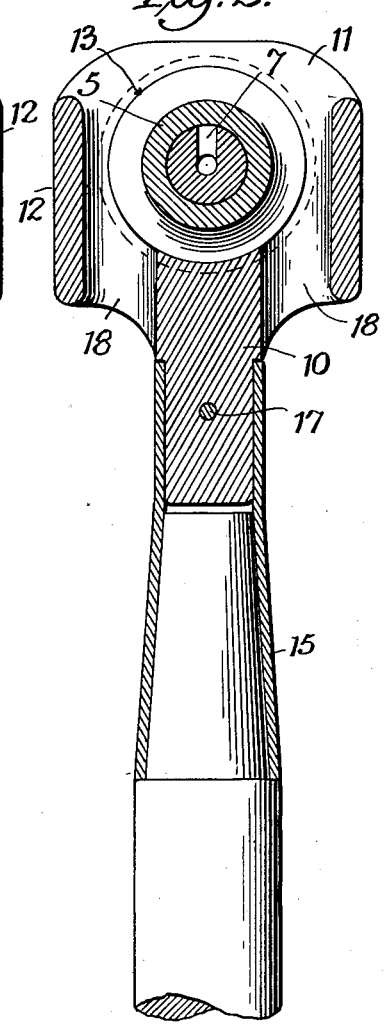
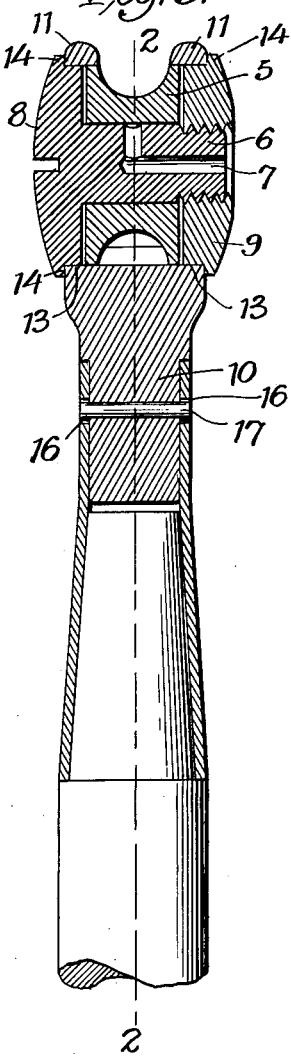
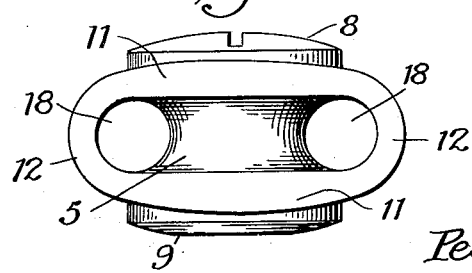
Inventor,
Peter V. Reynolds,
By James F. Duhamel,
Attorney.

Patented May 22, 1934

1,959,989

UNITED STATES PATENT OFFICE 1,959,989

FISHING ROD TIP AND THE LIKE

Peter V. Reynolds, Balboa, Canal Zone

Application March 21, 1933, Serial No. 661,978

3 Claims. (Cl. 43—24)

This invention relates to pulleys for fishing rod tips and devices where a line or rope is directed around a pulley and the object of the invention is to so confine the pulley within its supporting wall that there will be no crevice or space in which the line may enter and wedge.

These and other details and objects of the invention are more fully described in the following specification, set forth in the appended claims and illustrated in the accompanying drawing, wherein:

Figure 1 is a side elevation of the tip of a fishing rod showing the invention applied thereto.

Fig. 2 is a vertical sectional view of the same on the line 2—2 of Fig. 3.

Fig. 3 is a transverse vertical sectional view on the line 3—3 of Fig. 1.

Fig. 4 is a plan view of the tip and pulley.

The novel arrangement of the pulley and its mounting is shown in use on the tip of a fishing rod but it is obvious that it may thus be constructed and mounted in many varieties of mechanical articles, to safeguard a small or delicate cord and prevent its catching in the same.

The pulley 5 is of ordinary construction and having a circumferential groove. It is mounted on a threaded stud 6 with an L-shaped oil duct 7 and a slotted head 8, and its threaded end is adapted to carry the nut 9.

The tip comprises a central stem 10 and a box-like housing having sides 11 and ends 12, the sides having openings 13 into which fit the head 8 and the nut 9, both having overhanging flanges 14 that effectually close the openings 13 when the nut is screwed up on the stud 6.

The edges of the pulley 5 are of a diameter identical with the openings 13 and are located therein about half of the width of the sides 11, the head 8 and the nut 9 occupying the remaining halves, but the pulley is free to revolve and enough space is left between said pulley and the various parts for the oil that passes from the oil duct 7 may circulate and thoroughly lubricate the pulley.

The stem 10 may be mounted loosely in a ferrule 15, the latter having a horizontal slot 16 to receive a pin 17 that passes through the stem and not only retains same but permits of the partial rotation of the stem in the ferrule and permits of a free movement laterally of the fishing line.

In the above description and in the views it will be seen that the line may be passed up either of the passages 18 within the box-like structure, over the pulley 5 and down and out of the opposite passage and where the strain on one side of the tip is repeated or severe the pole is apt to be bent in that direction. By reversing the direction in this tip the rod may be kept straight and true.

By the arrangement of the stud that constitutes the bearing of the pulley the nut may be screwed on the stud very tightly without clamping the pulley and binding it and at the same time confine the lubricant within the inner walls of the pulley so it cannot escape.

It will be seen that each side of the pulley 5 is let into the openings 13 so that the sharp edges of the rim are not exposed, so that there is no danger of the line being cut as it travels over the said pulley.

It is obvious that the parts may be otherwise arranged and disposed without departing from the essential features above detailed or from the scope of the appended claims.

What I claim as new is:

1. In a fishing rod tip or the like, the combination of a ferrule, a stem fitting in the ferrule, a housing at the outer end of the stem and having opposite openings, a stud having a head to fit in one of the openings, a nut fitting in the opposite opening and engaging the stud, and a pulley journalled on the stud and having its sides located in the openings of the housing to abut the head of the stud and nut.

2. In a fishing rod tip or the like, the combination of a ferrule for the end of a rod, a stem swivelled in the same, a housing at the outer end of the stem and having openings in opposite sides, a stud having an oil duct, a head on the stud and partly filling one of the openings, a nut for the end of the stud and partly filling the opposite openings, and a pulley journalled on the stud and having its sides partly filling the said openings and abutting the head of the stud and its nut.

3. In a fishing rod tip or the like, the combination of a housing having openings in opposite sides, a stud having an oil duct, a head for the stud adapted to fit within one of the openings and having a flange at its edge, a nut adapted to fit the opposite opening to be screwed on the stud and having a similar flange to the head, and a pulley on the stud and whose sides are adapted to fit in said openings.

PETER V. REYNOLDS.